(12) United States Patent
Brouwer

(10) Patent No.: US 7,310,800 B2
(45) Date of Patent: Dec. 18, 2007

(54) METHOD AND SYSTEM FOR PATCHING ROM CODE

(75) Inventor: Roger J. Brouwer, Los Angeles, CA (US)

(73) Assignee: SafeNet, Inc., Belcamp, MD (US)

( * ) Notice: Subject to any disclaimer, the term of this patent is extended or adjusted under 35 U.S.C. 154(b) by 590 days.

(21) Appl. No.: 09/795,747

(22) Filed: Feb. 28, 2001

(65) Prior Publication Data
US 2002/0120810 A1    Aug. 29, 2002

(51) Int. Cl.
G06F 9/44    (2006.01)
G06F 12/00   (2006.01)
G06F 1/24    (2006.01)

(52) U.S. Cl. .................. 717/168; 711/103; 713/100
(58) Field of Classification Search ............... 717/168, 717/169; 713/2, 100; 711/103
See application file for complete search history.

(56) References Cited

U.S. PATENT DOCUMENTS

| | | | | |
|---|---|---|---|---|
| 4,985,825 A * | 1/1991 | Webb et al. | ................. | 711/169 |
| 5,210,854 A * | 5/1993 | Beaverton et al. | ........... | 717/174 |
| 5,796,972 A * | 8/1998 | Johnson et al. | ............. | 712/208 |
| 5,802,549 A * | 9/1998 | Goyal et al. | ................. | 711/102 |
| 5,974,508 A * | 10/1999 | Maheshwari | ................. | 711/133 |
| 6,049,672 A * | 4/2000 | Shiell et al. | ................. | 717/168 |
| 6,141,740 A * | 10/2000 | Mahalingaiah et al. | ..... | 711/215 |
| 6,209,127 B1* | 3/2001 | Mori et al. | .................. | 717/162 |
| 6,260,157 B1* | 7/2001 | Schurecht et al. | ............. | 714/8 |
| 6,438,664 B1* | 8/2002 | McGrath et al. | ............ | 711/154 |
| 6,637,023 B1* | 10/2003 | Ginsberg | .................... | 717/122 |
| 6,691,308 B1* | 2/2004 | Kasper | ........................ | 717/168 |
| 2002/0023206 A1* | 2/2002 | Klein | ............................ | 713/1 |

OTHER PUBLICATIONS

Jerry Jex, "Flash memory BIOS for PC and notebook computers", May 1991, IEEE Pacific Rim Conference on Communications, Computers and Signal Processing, vol. 2, pp. 692-695.*
"Computer User's Dictionary", 1998, Microsoft Press, p. 328.*
Timothy Sherwood, Brad Calder, "Patchable Instruction ROM Architecture", Nov. 2001, Proceedings of the international conference on Compilers, architecture, and synthesis for embedded systems, ISBN:1-58113-399-5, pp. 24-33.*

* cited by examiner

Primary Examiner—Tuan Dam
Assistant Examiner—Derek J. Rutten
(74) Attorney, Agent, or Firm—Drinker Biddle & Reath LLP

(57) ABSTRACT

A method and system for overriding selected ROM code functions or adding new ROM code functions within a processing system. A system designer determines an existing ROM address for the selected existing code function or a desired ROM address for the new code function. The system designer then programs a patch to replace the selected existing code function or programs a new code function. The patch or new code function is then loaded into a first memory. A loader module is also programmed and loaded into the first memory. Upon system boot-up, the loader module transfers any patches or new code functions within the first memory into a second memory that is memory-mapped to the ROM. This second memory can be accessed by the processor at a faster rate than the processor can access ROM. During a processor request cycle, the processor first examines the second memory for the presence of a desired ROM code function. If a patch or a new code function that has been transferred into the second memory maps to the location of the desired code function in ROM, then the processor will fetch the patch or new code function from the second memory.

16 Claims, 7 Drawing Sheets

METHOD AND SYSTEM FOR PATCHING ROM CODE

BACKGROUND OF THE INVENTION

1. Field of the Invention

The present invention relates, generally, to read-only memory (ROM) within a system on a chip (SoC) and, in preferred embodiments, to method and system for overriding selected ROM code functions or adding new code functions within an SoC.

2. Description of Related Art

An SoC is used in many computer and communication applications. An SoC generally comprises a microprocessor embedded on a chip. The microprocessor is coupled to a local bus on the chip. Included on this single chip are the hardware components required for a specific application. SoCs are usually more application-specific than general integrated circuits.

FIG. 1 illustrates exemplary SoC 101. SoC 101 comprises processor 100, which is electrically coupled to instruction cache 102 and data cache 104. Instruction cache 102 and data cache 104 are electrically coupled to processor local bus 106. SoC 101 also comprises various other hardware components that would be specific to a particular application. Examples of such typical hardware components are LCD display controller 112, keyboard controller 114, universal serial bus (USB) 116 and personal computer (PC) card interface 118. These components are electrically coupled to processor local bus 106. These hardware components are also connectable to devices that are external to SoC 101. In this example, LCD display controller 112 is electrically coupled to display screen 120, keyboard controller 114 is electrically coupled to keyboard 122, USB 116 is electrically coupled to peripheral 124, and PC card interface 118 is electrically coupled to PC card 126.

Memory interface 110 is provided on exemplary SoC 101 to act as an interface between external flash memory 190 and Static Random Access Memory (SRAM) 192 and processor local bus 206. Data and instructions executable by processor 100 can be stored in flash memory 190 and SRAM 192.

In certain applications where proprietary information needs to be safeguarded or in cryptographic and other applications where information security is important, it is often advantageous to also include ROM on-board the SoC. Because ROM resides on the SoC and is programmed in manufacturing, unauthorized access to the code within the ROM is made more difficult. This allows greater security against reverse engineering of proprietary code and against cryptographic attacks on secure information.

It will be assumed that exemplary SoC 101 is dedicated to such an application and therefore SoC 101 further comprises ROM 108, which is electrically coupled to processor local bus 106. Along with the advantages in the use of ROM on SoCs there are major drawbacks. One such drawback is that the ROM fabricated on the SoC cannot be changed. However, frequently errors or "bugs" in the ROM code are discovered after the ROM has been fabricated on the SoC. These bugs must be addressed and repaired in order to ensure the integrity of the code and of the overall functioning of the SoC.

One method for repairing bugs is to make the necessary corrections in the ROM code, program a new ROM, and then re-fabricate the SoC. This method results in either scrapping the SoCs with the old ROMs that contain bugs or selling these SoCs at a reduced price for use in limited applications (i.e., those in which the known bugs have an insignificant impact on the application). This method of repairing bugs can be very expensive and time consuming. In addition, subsequent testing of the re-fabricated SoC may reveal additional bugs requiring another re-fabrication and additional expenses and delays.

FIG. 2 illustrates a second method used in repairing bugs in ROM code. SoC 201 comprises processor 200, instruction cache 202, data cache 204, processor local bus 206, memory interface 210, and ROM 208. In addition FIG. 2 shows external flash memory 290, which is connected to processor local bus 206 through memory interface 210.

If bugs exist in the ROM code, they will be within particular code functions. Code functions may contain instructions, data, or both instructions and data. Longer and/or more complex code functions will have a higher likelihood of containing bugs than shorter and/or less complex code functions. Therefore, when ROM 208 is programmed, system designers usually place test code at the beginning of code functions that are more likely to have bugs. Blocks 230, 232, 234, 236, 238, 240, 242, 244, 246, and 248 in FIG. 2 represent code functions 1, 2, 3, 4, 5, 6, 7, 8, 9 and 10 respectively. FIG. 2 also shows two examples of test code, test 250 and test 252, located at the beginning of particular code functions. The operation of the test code is discussed in further detail below.

In FIG. 2 it is assumed that code functions 3 and 8 within ROM 208 are likely to have bugs. Therefore two tests, test 250 and test 252, are placed at the beginning of code functions 3 and 8 respectively. Each test is associated with a test bit located in a memory outside of ROM 208, which is flash memory 290 in the present example. This test bit will previously have been programmed to be in a "true" state if it has earlier been determined through testing of ROM 208 that its associated code function does indeed contain a bug.

When, during run-time, the test code within the tested code function is executed by processor 200, it will sample its associated test bit in flash memory 290. If processor 200 detects a true state on the test bit, processor 200 will not fetch the erroneous code function that is in ROM 208, but instead will fetch a replacement code function, also referred to in the present application as a "patch," that has previously been programmed into flash memory 290. Referring to FIG. 2., blocks 254, 256, 258 and 260 within flash memory 290 represent patches 1, 2, 3 and 4, respectively. Thus, the above described method "repairs" bugs in the ROM by overriding them with patches during run-time.

However, this method of overriding bugs has two problems associated with it. First, the extra lines of test code placed at the beginning of those code functions with a likelihood of containing bugs diminishes the performance of the SoC. The processor must spend time executing this test code at the beginning of each tested code function. Second, the performance of the SoC is further diminished by the run-time fetching of patches from flash memory 290 to replace ROM code functions containing bugs. This diminished performance is due to increased access time resulting from the lower frequencies achievable outside of the SoC.

Thus, a system designer normally does not place the test code at the beginning of every code function within the ROM. While this would be the surest way of repairing all bugs and ensuring reliability, the increase in code lines and subsequent diminished performance of the SoC would be unacceptable. Hence, the system designer must balance performance against reliability. Even if very few code functions are tested there will be some diminished performance of the SoC.

Another problem with this method results from the fact that because not every code function is tested, the possibility exists that bugs will remain in untested code functions. These untested code functions can not be repaired by the method described above, because there is no test bit associated with untested code functions. This fact can lead to a perpetuation of the bug throughout the ROM code through code branching, as described below.

Code branching results when one code function calls another code function within the code. The called code function is then executed by the processor. After execution of the called code function, the processor returns to the calling code function and continues execution of that code function. Code branching can occur in either direction. For example, code function 10 can branch backwards to code function 1.

Referring again to FIG. 2, directed lines 270, 272 and 274 represent code branching between different code functions within the code. Directed line 270 represents a code branch from code function 1 to code function 3. Similarly, directed line 272 represents a code branch from code function 3 to code function 6. Finally, directed line 274 represents a code branch from code function 6 to code function 10.

Thus, it can be seen from the above discussion that if an untested code function contains a bug and if the results of the execution of that code function by the processor are shared with other code functions through code branching, then the number of unreliable code functions increases. Even tested code functions that have previously been "repaired" may nevertheless become unreliable again after branching to another code function.

Finally, in addition to the difficulties involved in repairing bugs in the ROM code discussed above, it is also impossible to add additional code functions to the ROM code. Such additional ROM code functions may be determined by the system designer to be desirable after the ROM has already been programmed and fabricated within the SoC.

SUMMARY OF THE DISCLOSURE

Therefore, it is an advantage of embodiments of the present invention to provide method and system for "repairing" ROM code functions that do not require the re-fabrication of the chip on which the ROM resides.

It is a further advantage of embodiments of the present invention to provide method and system for "repairing" ROM code that does not increase the code size by the addition of test code at the beginning of code functions that are likely to contain bugs.

It is a further advantage of embodiments of the present invention to provide method and system for "repairing" ROM code that does not diminish the performance of the application with which the ROM is associated by run-time execution of test code at the beginning of code functions that are likely to contain bugs, or by run-time fetching of patches from memory outside of ROM that may require an increased access time.

It is a further advantage of embodiments of the present invention to provide method and system for "repairing" ROM code that does not allow perpetuation of a bug from an untested code function into other code functions within the ROM.

It is a further advantage of embodiments of the present invention to provide method and system for adding new code functions to the ROM code after the ROM has been programmed.

These and other advantages are accomplished according to a method and system for overriding selected code functions in a ROM by determining the ROM address of the selected code functions. Patches to override the selected code functions or new code functions are then programmed into a first memory outside of ROM.

During system boot-up, any patches or new code functions present in the first memory are transferred into a second memory by means of a loader module in the first memory. The second memory allows faster access by the processor and is memory-mapped to the ROM. After transfer of the patches or new code functions to the second memory, the loader module will return to the first instruction to be executed.

At run-time, during the processor request cycle, this second memory is examined for the presence of a desired ROM code function prior to examining the ROM. If the desired ROM code function is present in the second memory, then the processor fetches the desired ROM code function from the second memory. If the desired ROM code function is not already present in the second memory, then the processor fetches the desired code function from the ROM memory.

These and other objects, features, and advantages of embodiments of the invention will be apparent to those skilled in the art from the following detailed description of embodiments of the invention, when read with the drawings and appended claims.

DETAILED DESCRIPTION OF PREFERRED EMBODIMENTS

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

The method of run-time testing of code functions discussed in the background section of the present application has three major problems. First, ROM code grows due to the additional test code required at the beginning of suspected code functions. Second, the performance of the SoC suffers due to the additional time required by the system during run-time to run the test codes, sample the test bits and fetch the patches. Third, it is unlikely that the system designer will anticipate all code functions that require test code, leading to perpetuation of a bug in an untested code function into other code functions that branch to the untested code function and, consequently, to an increase in the number of patches required to repair these other code functions.

Embodiments of the present invention generally disclose methods and systems for overriding selected ROM code functions or adding new ROM code functions within an SoC, which require no extra test code within the ROM because no run-time test for bugs is required. In addition, run-time performance of the SoC is not diminished significantly because all patches are loaded into the second memory during system boot-up. The processor will have a faster access time to the second memory, which in a preferred embodiment of the present invention will be cache memory. Finally, there is no perpetuation of bugs from untested code functions into other code functions, because all bugs in code functions can be found during the ROM testing process and associated patches can be programmed into the first memory and transferred into the second memory during system boot-up.

Figure 1:
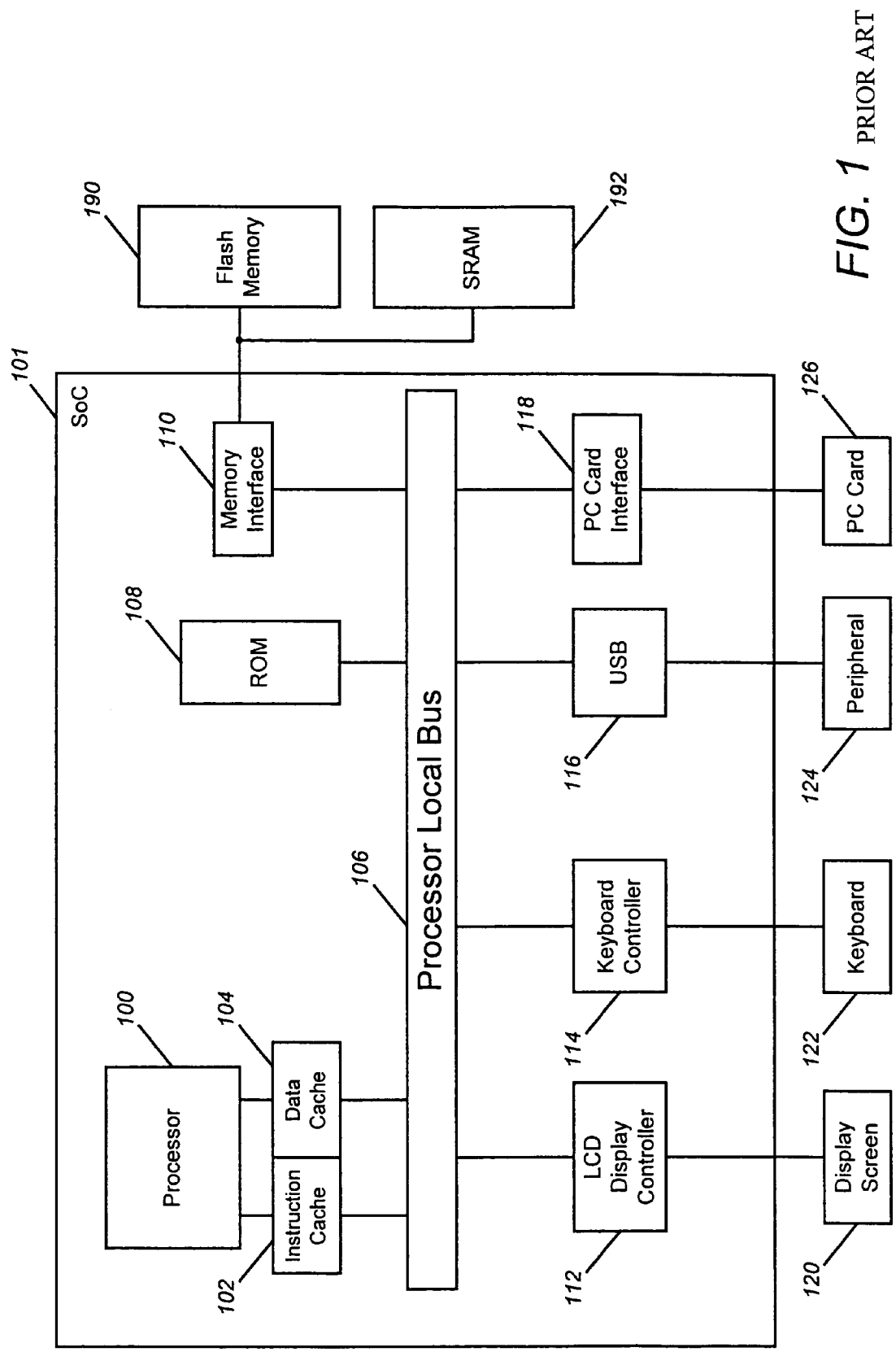
FIG. 1 illustrates a block diagram of an exemplary SoC comprising a processor, cache, a local bus, outside memory, and various hardware components and their respective controllers.
Figure 2:
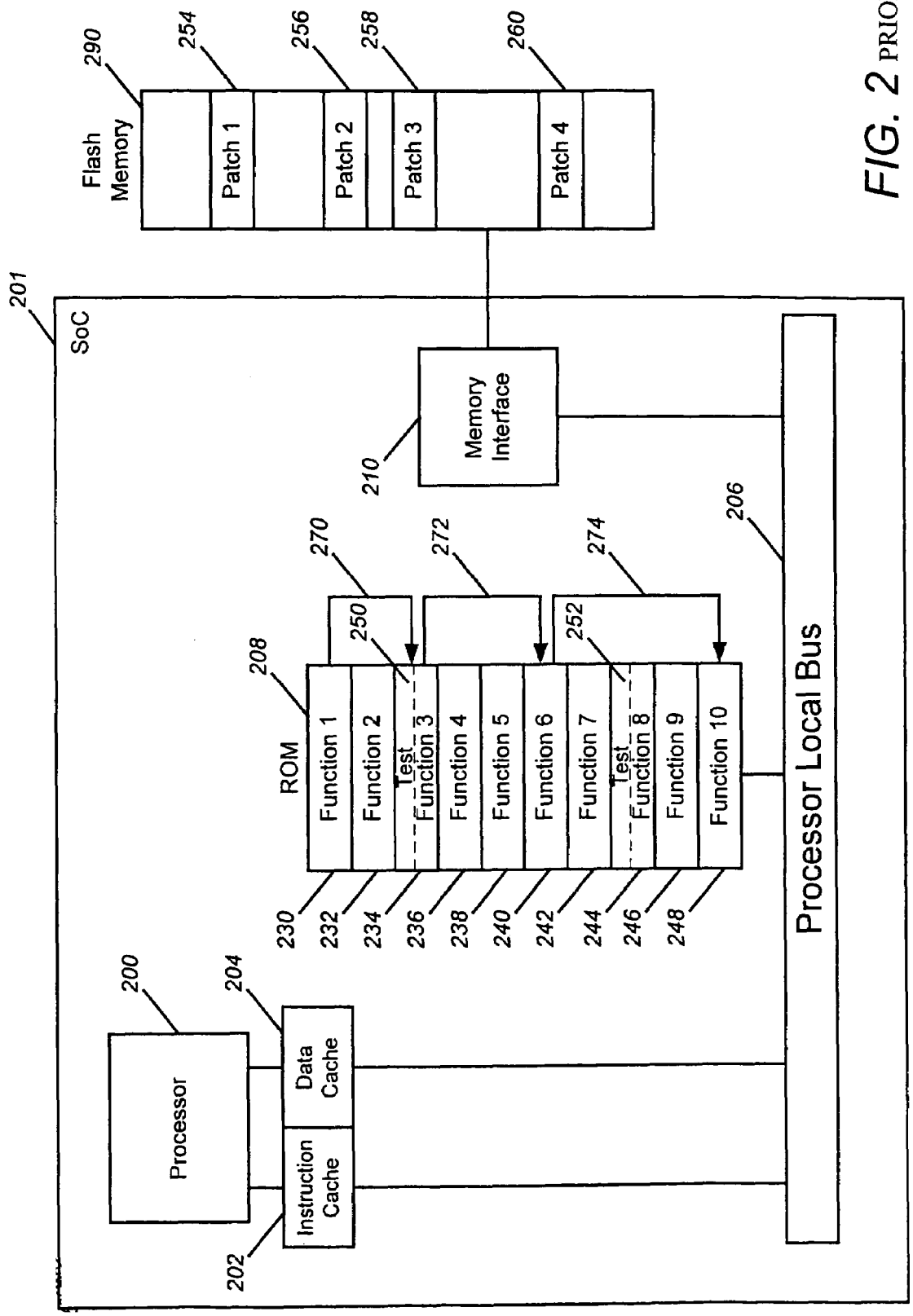
FIG. 2 illustrates a block diagram of an SoC, showing code functions within a ROM and patches within a flash memory.
Figure 3:
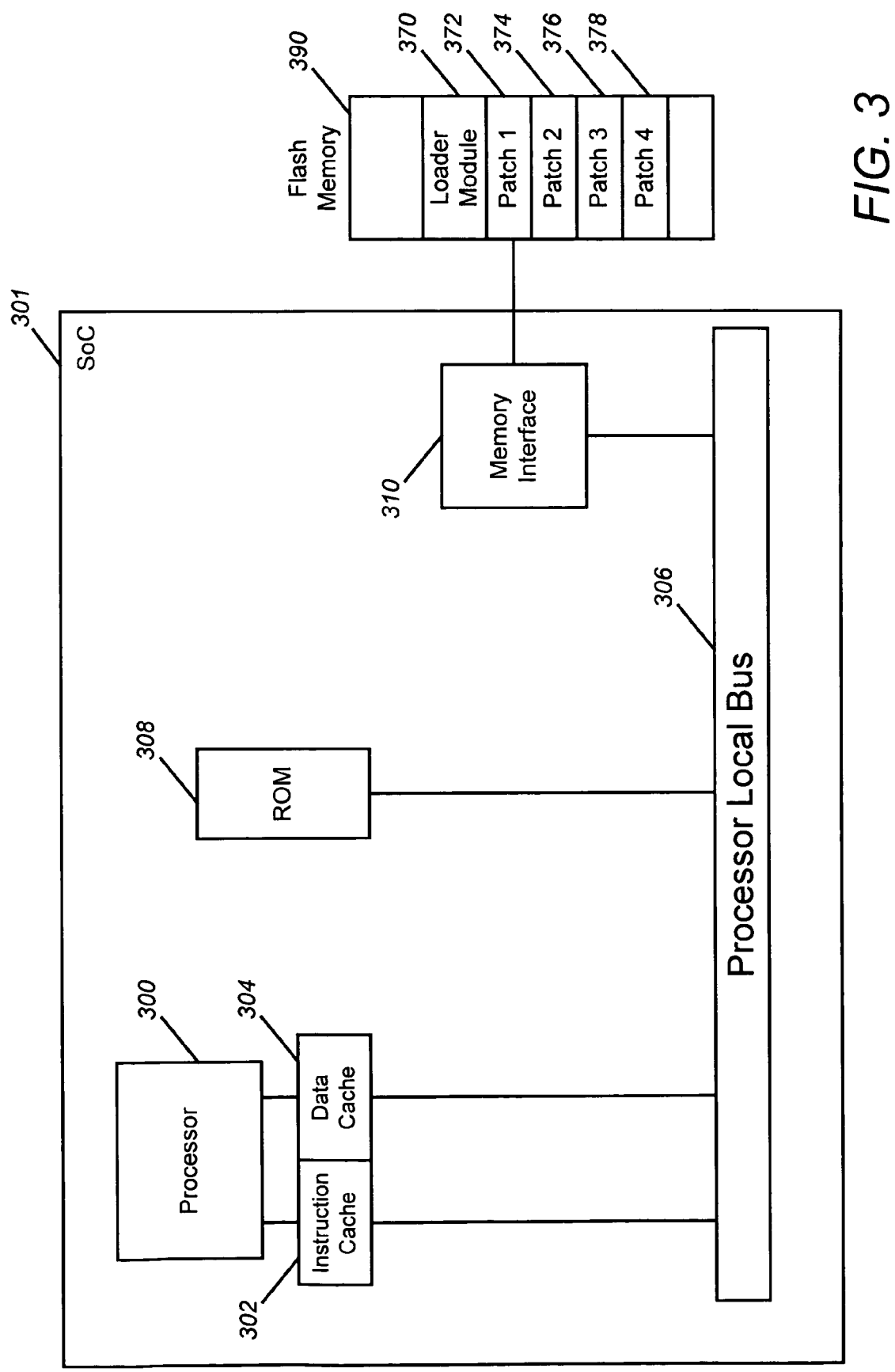
FIG. 3 illustrates a block diagram of an embodiment of the present invention showing a flash memory comprising a loader module and patches.

FIG. 3 illustrates an example of a preferred embodiment of the present invention. SoC 301 comprises processor 300, which may be electrically coupled to instruction cache 302 and data cache 304. Instruction cache 302 and data cache 304, in turn, may be electrically coupled to processor local bus 306. SoC 301 further comprises ROM 308, which may be electrically coupled to processor local bus 306. SoC 301 further comprises memory interface 310, which may be electrically coupled to processor local bus 306. Flash memory 390 is external to SoC 301 and may be electrically coupled to memory interface 310.

The following is an overview of the present invention's method in reference to FIG. 3. The system designer first determines by testing of the SoC which ROM code functions contain bugs. Patches for all code functions containing bugs are then programmed and loaded into a first memory, which is flash memory 390 in the present embodiment of the invention. A loader module is also installed into the first memory. Upon boot-up of the system, the loader module will transfer any patches present in the first memory into a second memory, which may be instruction cache 302 and data cache 304 in a preferred embodiment of the invention. This second memory is memory-mapped to the ROM. The loader module will then return to the first instruction to be executed.

During run-time, when processor 300 requests a desired ROM code function, the processor request will contain the ROM address of the desired code function, which will be compared to the memory addresses of the instructions and data within the second memory. If there is a match, also referred to in the present application as a "hit," then the desired code function is already present in the second memory. Thus, processor 300 will fetch the desired code function from the second memory. If the desired code function is not present in the second memory, also referred to in the present application as a "miss," processor 300 will fetch the desired code function from the ROM.

An implementation of the present invention's method and system for overriding selected ROM code functions or adding new code functions within an SoC will now be discussed in greater detail below.

Referring again to FIG. 3, it can be seen that flash memory 390 is external to SoC 301. However, in alternative embodiments of the present invention, flash memory 390 could be fabricated on the SoC instead of being external to the SoC. Also, various other types of memory could be used as the first memory in place of flash memory. For example, in one alternative embodiment of the present invention, a one-time programmable ROM (OTPR) could be used as the first memory and fabricated on the SoC without being programmed beforehand. Subsequently, after bugs are found in the ROM code, the OTPR could be programmed with the necessary patches or new code functions, and the loader module.

In another alternative embodiment of the present invention, a battery-backed SRAM could serve as the first memory and be fabricated on the SoC and programmed with the patches or new code functions and the loader module. In yet another alternative embodiment of the present invention, an electronically erasable programmable read-only memory (EEPROM) could serve as the first memory. It is understood by those skilled in the art that other types of memory can be used as the first memory without departing from the scope of the present invention.

In the example of FIG. 3, flash memory 390 contains patch 372, patch 374, patch 376 and patch 378. Flash memory 390 also contains loader module 370. As discussed above, each of patches 372, 374, 376, and 378 are programmed to replace an associated code function in ROM 308 that contains a bug. These patches in flash memory 390 will have memory addresses that correspond to the memory addresses of their associated code functions in ROM 308. The loader module has been programmed to transfer patches 372, 374, 376, and 378 from flash memory 390 into instruction cache 302 and data cache 304 during system boot-up. Instructions in the first memory are transferred to instruction cache 302, and data in the first memory are transferred to data cache 304.

Instruction cache 302 and data cache 304 represent a typical cache configuration. In the following discussion this typical cache is generally described. Analysis of typical computer programs shows that at any given time only a few areas of the memory are being accessed by the processor. Therefore, system designers take advantage of this fact to store the instructions and data in these localized areas of memory in cache memory. A basic characteristic of cache memory is a fast access time. Therefore, if the parts of the program code that are currently being accessed the most are stored in cache memory, the overall performance of the system will improve.

Instructions and data transferred to cache memory are mapped to the memory from which they were transferred. In other words, for every instruction or data word stored in cache, there is a copy of that word in the memory from which the word was transferred. The processor communicates with both memories. When the processor requests a desired instruction or data word, the processor request is first sent to the instruction or data cache, respectively.

The processor request includes the address in memory of the desired instruction or data word. All words stored in the cache have been memory-mapped, as discussed above. A comparison is performed on the memory address in the processor request to determine whether the desired word is already present in the cache. If the result of the comparison is a hit, then the processor fetches the desired word from the cache with a much faster access time. If the result of the comparison is a miss, then the processor must fetch the desired word from memory outside the cache, which will increase the access time.

A preferred embodiment of the present invention uses the memory-mapping characteristics of the cache memory to override selected ROM code functions within an SoC, as described below in relation to the example of FIG. 4.

Figure 4:
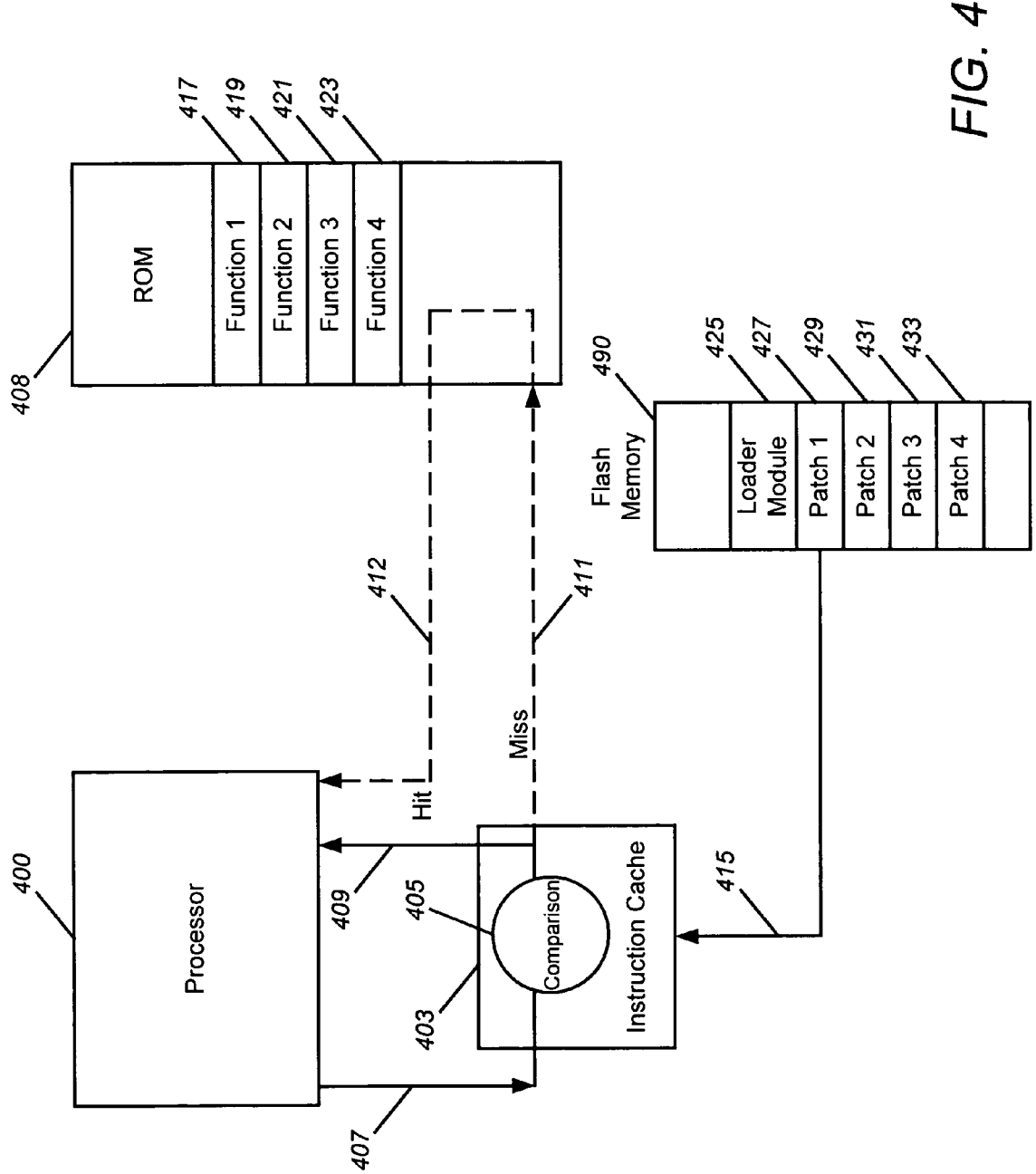
FIG. 4 illustrates a schematic overview of the operation of an embodiment of the invention during system boot-up and during a typical processor request cycle.

FIG. 4 illustrates a schematic overview of the operation of a preferred embodiment of the present invention during system boot-up and during a typical processor request cycle. FIG. 4 shows processor 400, which in a preferred embodiment of the invention is electrically coupled to both instruction cache 403 and ROM 408. Although the cache is referred to as instruction cache 403 for simplicity, the system and method discussed below could also apply to a data cache or a unified cache. Also shown in FIG. 4 is flash memory 490, which in a preferred embodiment is electrically coupled to instruction cache 403. ROM 408 contains code functions 417, 419, 421 and 423.

During system boot-up, loader module 425 within flash memory 490 will transfer patch 427, patch 429, patch 431 and patch 433 into instruction cache 403. This transfer is represented by directed line 415. Thus, after system boot-up and during run-time, instruction cache 403 will contain all the patches necessary to override code function 417, code function 419, code function 421, and code function 423, respectively, which are all assumed in the present example to contain bugs.

As an example, during system boot-up, patch 427 will be transferred by loader module 425 from flash memory 490 into instruction cache 403. Assuming for the present example that patch 427 was programmed to repair code function 417, the location of patch 427 in instruction cache 403 will be memory-mapped to the memory location of code function 417 in ROM 408.

During run-time, processor 400 may send a request, represented by directed line 407, to instruction cache 403 for code function 417. Thus, code function 417 is the desired code function. The processor request will comprise the memory address corresponding to the memory location of code function 417 in ROM 408. Comparison 405 will be performed between the memory address in the processor request and the memory addresses contained in instruction cache 403. When the memory address of code function 417 in instruction cache 403 is compared to the memory address in processor request 407, there will be a hit and patch 427 will be fetched from instruction cache 403. This fetch operation is represented by directed line 409.

Thus, code function 417, which contained a bug, has been overridden by patch 427. If there had been a miss, then processor 400 would have gone to ROM 408 to fetch the desired code function. This operation is represented by directed line 411. The desired code function will then be fetched from ROM 408. This fetch operation is represented by directed line 413.

Using the method of a preferred embodiment of the invention described above, the system designer must ensure that once the patches have been transferred to instruction cache 403, they will not be superseded, or "flushed out" of instruction cache 403 by other instructions or data during run-time. This flushing out may occur, for example, when code in memory external to instruction cache 403 is larger than the capacity of instruction cache 403. If that is the case, then code in the external memory that is currently being accessed may take the place of the patches within instruction cache 403.

Therefore, in one embodiment of the present invention, the system designer will ensure that the code in the outside memory is smaller than the capacity of the cache. In another alternative embodiment of the present invention, cache technology is used that allows selected locations of the cache to be "locked." Using this cache technology, once the patches are transferred to the cache, they can not be flushed out during run-time.

Figure 5:
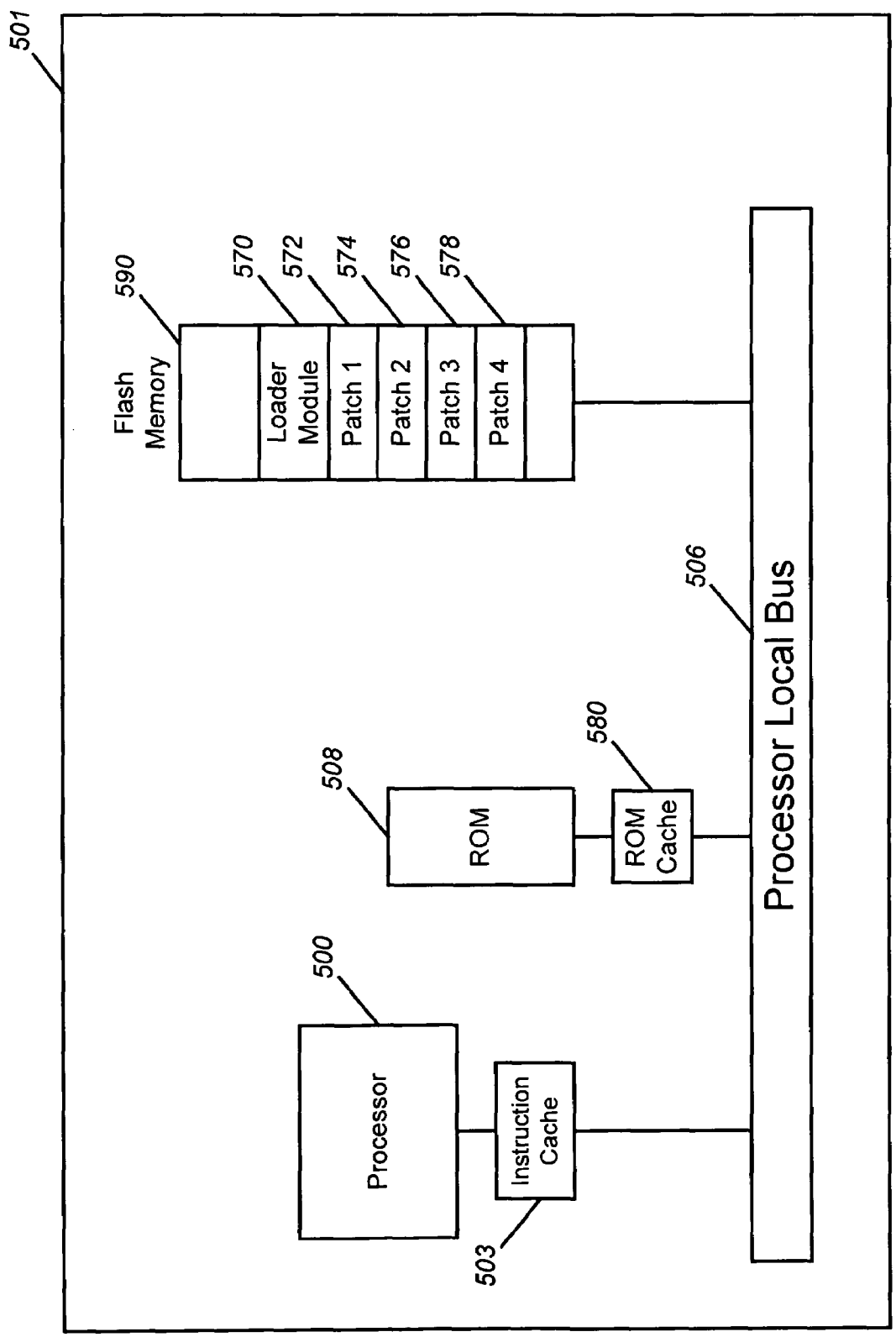
FIG. 5 illustrates a ROM cache dedicated to a ROM on an SoC, according to an embodiment of the present invention.

FIG. 5 illustrates another alternative embodiment of the present invention which avoids the flushing problem discussed above. ROM cache 580 could be implemented on SoC 501. ROM cache 580 can be dedicated to ROM 508 and can be electrically coupled to processor local bus 506. Instruction cache 503 is the processor instruction cache previously discussed and can be electrically coupled to processor 500. In the present embodiment, flash memory 590 is fabricated on SoC 501 and can be electrically coupled to processor local bus 506. Loader module 570 and patches 572, 574, 576, and 578 have previously been programmed and loaded into flash memory 590. During system boot-up, loader module 570 will transfer patches 572, 574, 576 and 578 into ROM cache 580. Because ROM cache 580 is dedicated to ROM 508, once the patches are transferred into ROM cache 580, they will not be flushed out by any other code.

Figure 6:
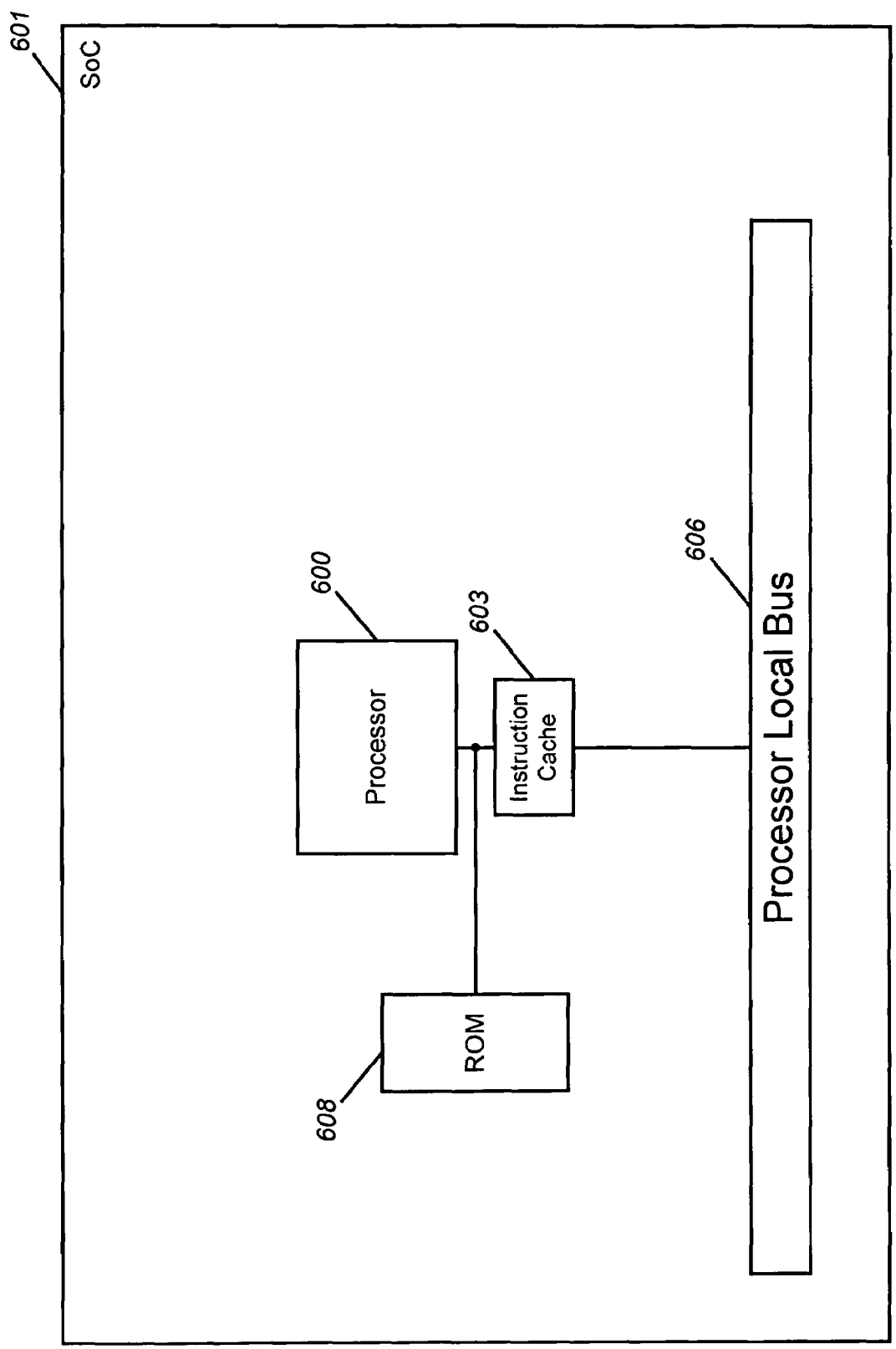
FIG. 6. illustrates a ROM electrically coupled directly to a processor on an SoC, according to an embodiment of the present invention.

FIG. 6 illustrates another alternative embodiment of the present invention. ROM 608 could be electrically coupled directly to processor 600 on SoC 601. Instruction cache 603 could be electrically coupled to processor 600 and processor local bus 606. ROM 608 can contain both instructions and data, or in the alternative, separate ROMs for instructions and data could be electrically coupled directly to processor 600. Depending on the processor architecture used, additional interface logic may be required to arbitrate between ROM 608 and instruction cache 603, since both are electrically coupled directly to processor 600. Otherwise, conflicts can occur between ROM 608 and instruction cache 603. For example, when a desired instruction within ROM 608 is already present in instruction cache 603, processor 600 may try to access ROM 608 first anyway, in the absence of such arbitration logic.

An advantage to the embodiment of the present invention shown in FIG. 6 is the added security provided by the isolation of the code within ROM 608 from other devices that may be able to access processor local bus 606. If ROM 608 is electrically coupled to processor local bus 606, then other devices that are electrically coupled to processor local bus 606 may be able to access the code within ROM 608. Therefore, if the system designer desires that the code within ROM 608 be accessible only to processor 600 for security reasons, the alternative embodiment of the present invention shown in FIG. 6 can be implemented.

Figure 7:
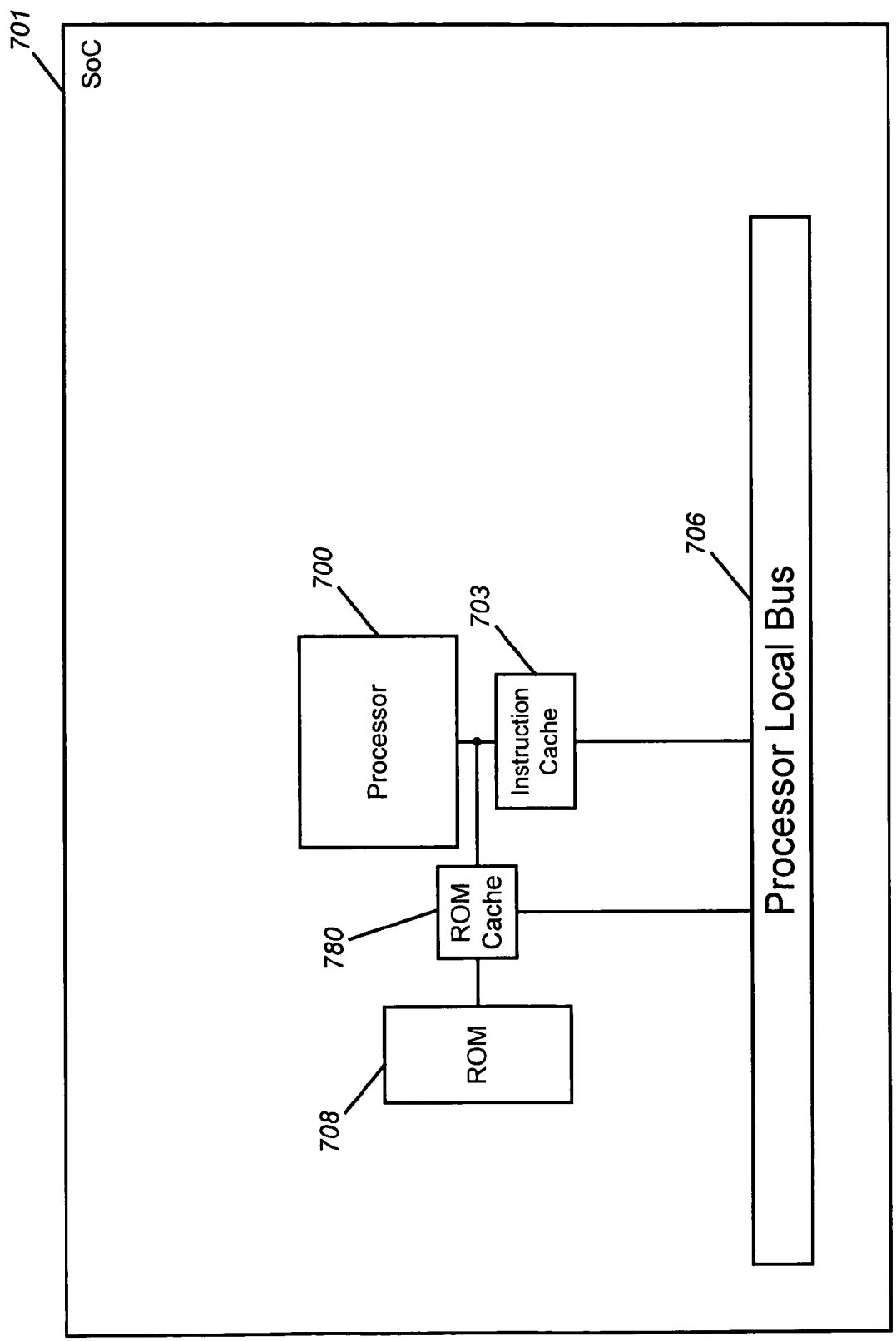
FIG. 7 illustrates a ROM electrically coupled directly to a processor and a ROM cache dedicated to the ROM on an SoC, according to an embodiment of the present invention.

FIG. 7 illustrates another alternative embodiment of the present invention. ROM 708 could be electrically coupled directly to processor 700 on SoC 701. ROM cache 780 could be dedicated to ROM 708 for the reasons described above in relation to FIG. 5. It would be necessary for ROM cache 780 to be electrically coupled to a local bus, such as processor local bus 706 in the present embodiment, in order that patches could be written into ROM cache 780 during system boot-up.

It should be noted that in addition to repairing existing ROM code functions, preferred embodiments of the present invention also allow the system designer to add new ROM code functions. If the system designer determines that new ROM code functions are desirable after the ROM has already been programmed, the present invention allows new ROM code functions to be loaded into the first memory prior to system boot-up. The system designer will assign a memory address to the new code function that corresponds to the desired ROM address. The new ROM code function can then be transferred into the second memory during system boot-up.

Therefore, embodiments of the present invention provide method and system for overriding selected ROM code functions or adding new code functions to a ROM within an SoC. A method in a processing system is disclosed that overrides selected ROM code functions without adding additional test code at the beginning of suspected code functions. Thus, embodiments of the present invention avoid unwanted growth in the ROM code. Embodiments of the present invention also provide a method to transfer patches to override existing ROM code functions or add new ROM code functions, during system boot-up, to cache memory having fast access time during run-time. Thus, embodiments of the present invention avoid system performance degradation due to run-time testing of suspected ROM code functions, sampling of test bits, and fetching of patches from memory with extended access times. Embodiments of the present invention also provide a method for programming patches for all ROM code functions containing bugs and loading these patches into a first memory prior to system boot-up. Thus, embodiments of the present invention avoid the need for an increased number of patches due to the perpetuation of bugs, during run-time, from untested ROM code functions into other code functions as a result of code branching.

What is claimed is:

1. In a processing system, a method of providing a patch to replace a selected existing code function in a ROM or adding a new code function, the method comprising the steps of:
    determining an existing ROM address for the selected existing code function or a desired ROM address for the new code function;
    installing a loader module in a first location in a first memory;
    installing the patch or the new code function in a second location in the first memory, the patch comprising a replacement code function;
    pre-loading the patch or the new code function by transferring the patch or the new code function in response to instructions in the loader module before the patch or the new code is required by the processor to a cache, the cache being configured to cache instructions from the ROM and from the first memory, wherein the cache is memory-mapped to the existing ROM address for the selected code function or the desired ROM address for the new code function; and
    when requiring instructions located at the existing ROM address or the desired ROM address, fetching the patch from the cache rather than the ROM, or fetching the new code function from the cache.

2. The method of claim 1, the step of pre-loading the patch or the new code function by transferring the patch or the new code function in response to instructions in the loader module during system boot-up to a cache comprising transferring the patch or the new code function to a cache dedicated to the processor.

3. The method of claim 1, the step of pre-loading the patch or the new code function by transferring the patch or the new code function in response to instructions in the loader module during system boot-up to a cache comprising transferring the patch or the new code function to a cache dedicated to storing the patch or the new code function.

4. The method of claim 1, further including the step of locking a location in the cache to which the patch or the new code function has been transferred to prevent the patch or the new code function from being flushed from the cache.

5. The method of claim 1, the step of installing the patch or the new code function in the second location in the first memory comprising installing the patch or the new code function into a flash memory.

6. The method of claim 1, the step of installing the patch or the new code function in the second location in the first memory comprising installing the patch or the new code function into an SRAM.

7. The method of claim 1, the step of installing the patch or the new code function in the second location in the first memory comprising installing the patch or the new code function into a one-time programmable ROM.

8. The method of claim 1, the step of installing the patch or the new code function in the second location in the first memory comprising installing the patch or the new code function into an EEPROM.

9. A system for repairing a selected existing code function or adding a new code function in a ROM, the system comprising:
    a processor for processing instructions and data;
    a ROM communicatively coupled to the processor for storing instructions and data, the ROM comprising a selected existing code function with an existing ROM address;
    a first memory communicatively coupled to the processor and comprising a loader module and a patch or a new code function, the patch comprising a replacement code function; and
    a cache communicatively coupled to the processor and the first memory and memory-mapped to the ROM, the cache being configured to cache instructions from the ROM and from the first memory;
    wherein the processor is programmed for
    pre-loading the patch or the new code function by transferring the patch before the patch is required by the processor to a first location in the cache that is memory mapped to the existing ROM address of the selected existing code function, or by transferring the new code function before the new code function is required by the processor to a second location in the cache that is memory mapped to a desired ROM address, and
    wherein when the processor requires an instruction located at the existing ROM address or the desired ROM address, the processor fetches the patch from the cache rather than the ROM, or fetches the new code function from the cache.

10. The system of claim 9, wherein the cache is dedicated to the processor.

11. The system of claim 9, wherein the cache is dedicated to storing the patch or the new code function.

12. The system of claim 9, wherein the first or second locations are locked to prevent the patch or the new code function from being flushed form the cache.

13. The system of claim 9, wherein the first memory is a flash memory.

14. The system of claim 9, wherein the first memory is an SRAM.

15. The system of claim 9, wherein the first memory is a one-time programmable ROM.

16. The system of claim 9, wherein the first memory is an EEPROM.

* * * * *